US008326367B2

(12) United States Patent
Kuroda et al.

(10) Patent No.: US 8,326,367 B2
(45) Date of Patent: Dec. 4, 2012

(54) FOLDABLE IMAGE PROCESSING APPARATUS

(75) Inventors: Yasuko Kuroda, Tokyo (JP); Masao Hara, Tokyo (JP); Makoto Uchino, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 511 days.

(21) Appl. No.: 12/186,735

(22) Filed: Aug. 6, 2008

(65) Prior Publication Data
US 2009/0124292 A1 May 14, 2009

(30) Foreign Application Priority Data
Nov. 12, 2007 (JP) ................. P2007-293625

(51) Int. Cl.
*H04B 1/38* (2006.01)
*H04M 1/00* (2006.01)
(52) U.S. Cl. ................. 455/566; 455/575.3
(58) Field of Classification Search .......... 455/566, 455/569.1, 575.3, 90.3, 575.1
See application file for complete search history.

(56) References Cited

U.S. PATENT DOCUMENTS

| 6,466,202 B1 * | 10/2002 | Suso et al. ............. 345/169 |
| 6,535,749 B1 * | 3/2003 | Iwata et al. ............ 455/556.2 |
| 6,751,446 B1 * | 6/2004 | Kim et al. ............. 455/90.1 |
| 7,221,914 B2 * | 5/2007 | Ho et al. .............. 455/90.3 |
| 7,272,423 B2 * | 9/2007 | Satoh et al. ............. 455/575.3 |
| 7,471,283 B2 * | 12/2008 | Kim et al. ............. 345/173 |
| 7,581,893 B2 * | 9/2009 | Miramontes ............ 396/448 |
| 7,660,410 B2 * | 2/2010 | Mizushina ............ 379/433.07 |
| 2002/0037754 A1 | 3/2002 | Hama et al. |
| 2003/0020694 A1 * | 1/2003 | Kim et al. ............. 345/169 |

(Continued)

FOREIGN PATENT DOCUMENTS
EP  0 897 236 A2  2/1999
(Continued)

OTHER PUBLICATIONS

Extended European Search Report dated Feb. 3, 2009, 6 pages, issued in counterpart European Application No. EP 08014055.1-2414.

(Continued)

*Primary Examiner* — Brandon Miller
(74) *Attorney, Agent, or Firm* — Maschoff Gilmore & Israelsen (57) ABSTRACT

An information processing apparatus includes a first casing and a second casing hinge-connected to the first casing via a hinge part. A sub display provided to the second casing is exposed to the outside when the first casing and the second casing are in a closed state, and displays a plurality of input numeral keys in a first display area when the first and second casings are in the closed state. A control unit accepts an input of any input numeral key from among the plurality of the input numeral keys displayed in the first display area and decides the input of the accepted input numeral key. While following pressing of an outgoing call key provided to the second casing, an outgoing call is performed to another information processing apparatus identified by a combination of the decided numerals based on the input numeral keys whose inputs have been decided.

10 Claims, 9 Drawing Sheets

U.S. PATENT DOCUMENTS

| | | | |
|---|---|---|---|
| 2003/0162569 A1 | 8/2003 | Arakawa et al. | |
| 2003/0181228 A1* | 9/2003 | Kim | 455/575.3 |
| 2005/0064911 A1 | 3/2005 | Chen et al. | |
| 2006/0209505 A1* | 9/2006 | Kim | 361/683 |
| 2006/0264243 A1* | 11/2006 | Aarras | 455/566 |
| 2007/0281759 A1* | 12/2007 | Choi | 455/575.1 |
| 2008/0009330 A1* | 1/2008 | Jung et al. | 455/575.3 |
| 2008/0068335 A1 | 3/2008 | Arakawa et al. | |
| 2008/0167081 A1* | 7/2008 | Eng | 455/566 |
| 2008/0188267 A1* | 8/2008 | Sagong | 455/566 |
| 2009/0027347 A1* | 1/2009 | Wakefield et al. | 345/172 |

FOREIGN PATENT DOCUMENTS

| | | |
|---|---|---|
| JP | 2004-088512 A | 8/2008 |
| WO | WO 2005/062581 A1 * | 7/2005 |
| WO | WO 2005062581 A1 * | 7/2005 |

OTHER PUBLICATIONS

Office Action dated Feb. 7, 2011 as received in related application EP 08 014 055.1.

EP Office Action dated Jan. 5, 2012 as received in application No. 08014055.1.

* cited by examiner

[KEY OPERATION]

| Key | Description | Remarks |
|---|---|---|
| Send | PERFORM SENDING OPERATION | |
| End | TO CLOCK DISPLAY SCREEN | Clock View |
| Up | CURSOR MOVEMENT IN SCREEN (UP) | |
| Down | CURSOR MOVEMENT IN SCREEN (DOWN) | |
| Right | CURSOR MOVEMENT IN SCREEN (RIGHT) | |
| Left | CURSOR MOVEMENT IN SCREEN (LEFT) | |
| Center | DECISION ON CURSOR POSITION IN SCREEN | |
| Side Up | ― | |
| Side Down | ― | |

FOLDABLE IMAGE PROCESSING APPARATUS

BACKGROUND OF THE INVENTION

1. Field of the Invention

The present invention relates to an information processing apparatus. In particular, the invention relates to an information processing apparatus such as a cellular phone capable of executing an outgoing call processing by way of input of a telephone number.

2. Description of the Related Art

In recent years, cellular phones having various types have been proposed. For example, a straight style cellular phone, a flip style cellular phone in which a straight style key pad part is covered with a rotatable top, a foldable style cellular phone, a slide style cellular phone, and the like have been proposed.

In a foldable style cellular phone in a related art, in general, the shape is designed to be compact. When a user carries out a phone call by using the cellular phone, the foldable style cellular phone is put in an opened state to carry out the call. It should be noted that the foldable style cellular phone in the related art generally have a first casing as a main body and a second casing to which a main display is mounted. The first casing and the second casing are hinge-connected via a hinge part. Furthermore, a sub display is provided on a back face side of the main display in the second casing. As a technology related to the foldable style cellular phone, for example, a technology described in Japanese Unexamined Patent Application Publication No. 2004-88512 is known.

Incidentally, among the foldable style cellular phones, some cellular phones, including a large display screen and a key board and multiple functions, have been appeared as data terminals. The foldable style cellular phone as this data terminal is superior in functionality as compared with the cellular phone in the related art, but inevitably the shape becomes totally large. For that reason, if the phone call is carried out with the foldable style cellular phone in the opened state similarly to the foldable style cellular phone in the related art, the ease of use is deteriorated.

In view of the above, such a method is considerable that the outgoing call or conversation is carried out with the foldable style cellular phone in a closed state. However, in the case of the foldable style cellular phone as the data terminal, even if the conversation can be carried out with the foldable style cellular phone in the closed state, when the cellular phone in the closed state, operation keys such as a key board provided to the first casing on the main body side are hidden. In this state, the user cannot start the outgoing call by using the key board to input a telephone number of an intended party or the like. Of course, at the time of the outgoing call or conversation, the cellular phone is put in the opened state once, and then the user uses the key board to input the telephone number of the intended party or selects the telephone number of the intended party with use of an incoming call or outgoing call history, so that the user can start the outgoing call by using the cellular phone. However, the user needs to perform opening/closing of the cellular phone at least one time at the time of the outgoing call or conversation.

In this way, when the outgoing call or conversation is carried out by using the foldable style cellular phone as the data terminal, there is a problem that the ease of use is not satisfactory to the user.

SUMMARY OF THE INVENTION

The present invention to provide has been made in view of the above-mentioned situation, and it is an object of the invention to provide an information processing apparatus in which even if a foldable style cellular phone is in a closed state, it is possible to easily carry but an outgoing call or incoming call processing with use of operation keys.

In order to solve the above-mentioned problem, according to an aspect of the present invention, there is provided an information processing apparatus, including: a first casing; a second casing which is hinge-connected to the first casing via a hinge part; a display unit which is provided to the second casing, exposed to an outside when the first casing and the second casing are in a closed state, and configured to display a plurality of input numeral keys in a first display area when the first casing and the second casing are in the closed state; a decision unit configured to accept an input of any of the input numeral key from among the plurality of the input numeral keys displayed in the first display area by the display unit and decide the input of the accepted input numeral key; and an outgoing call unit configured to perform an outgoing call to another information processing apparatus which is identified by a combination of the decided numerals based on the input numeral keys whose inputs are decided by the decision unit via a network in accordance with a press of an outgoing call key provided to the second casing.

According to the aspect of the present invention, even in a case where the foldable style cellular phone is in the closed state, it is possible to easily carry out the outgoing call or incoming call processing with use of the operation key.

DESCRIPTION OF THE PREFERRED EMBODIMENTS

Hereinafter, embodiments of the present invention will be described with reference to the drawings.

Figure 1:
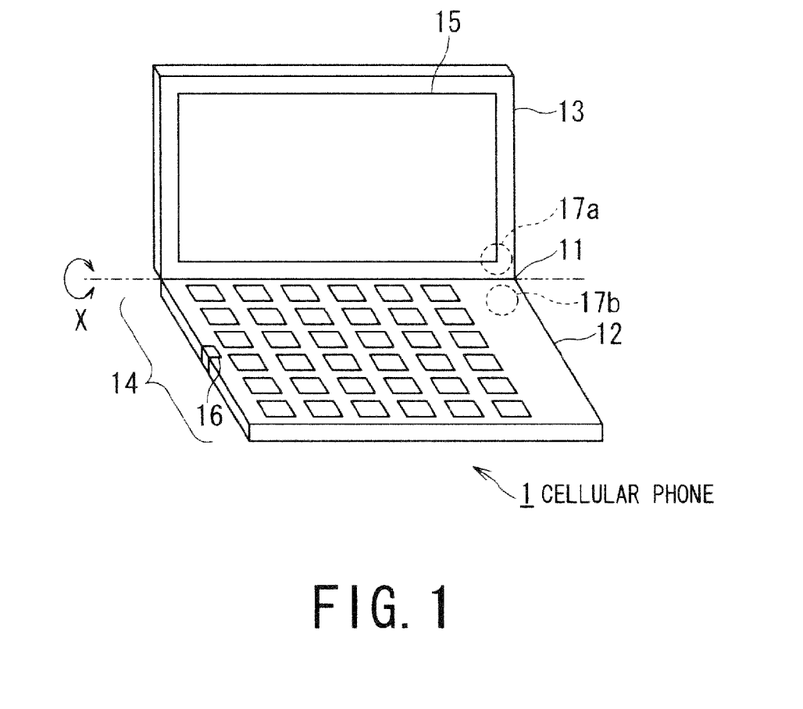
FIG. 1 illustrates an external configuration of a cellular phone which can be applied to an information processing apparatus according to an embodiment of the present invention.

FIG. 1 illustrates an external configuration of a cellular phone 1 which can be applied to an information processing apparatus according to an embodiment of the present invention. It should be noted that FIG. 1 illustrates an external configuration of the cellular phone 1 opened at about 180 degrees (opened state) as viewed from the front.

As illustrated in FIG. 1, the cellular phone 1 includes a first casing 12 and a second casing 13 which are hinge-connected with a hinge part 11 at the center, and is formed so as to be foldable in an arrow X direction via the hinge part 11. At a predetermined location inside the cellular phone 1, an antenna for transmission and reception (an antenna 31 in FIG. 3 which will be described later) is provided. The cellular phone 1 is adapted to transmit and receive a radio wave with a base station (not shown) via the built-in antenna.

The first casing 12 is provided with first operation keys 14 on its surface, such as alphanumeral keys from "0" to "9", an outgoing call key, a redial key, a power key, a clear key, and an electronic mail key, and by using the first operation keys 14, it is possible to input various instructions. The first casing 12 is provided with an arrow key and a decision key as the first operation keys 14. As a user operates the arrow key in up, down, left, and right directions, an allocated cursor can be moved in the up, down, left, and right directions. To be more specific, various operations are executed such as a scroll operation of a telephone directory list and an electronic mail displayed on a main display 15 of the second casing 13, a page turning over operation of a simplified home page, and an image feed operation.

In addition, the first casing 12 is provided with a microphone 16 at a lower part of the first operation keys 14. With the microphone 16, speech from the user at the time of conversation is collected.

On the other hand, the second casing 13 is provided with the main display 15 on its front. In addition to the reception state of the radio wave, the battery remaining amount, other party names and telephone numbers registered as the call register, the transmission history, and the like, the main display 15 can display the contents of the electronic mail, the simplified home page, an image captured by a CCD (Charge Coupled Device) camera (a CCD camera 48 of FIG. 3), a content received from an external content server (not shown), and a content stored in a memory card (a memory card 46 in FIG. 3 which will be described later). Also, magnetic sensors 17a and 17b for detecting the states of the cellular phone 1 (the closed state and the opened state) are provided at predetermined positions inside the first casing 12 and the second casing 13.

Figure 2:
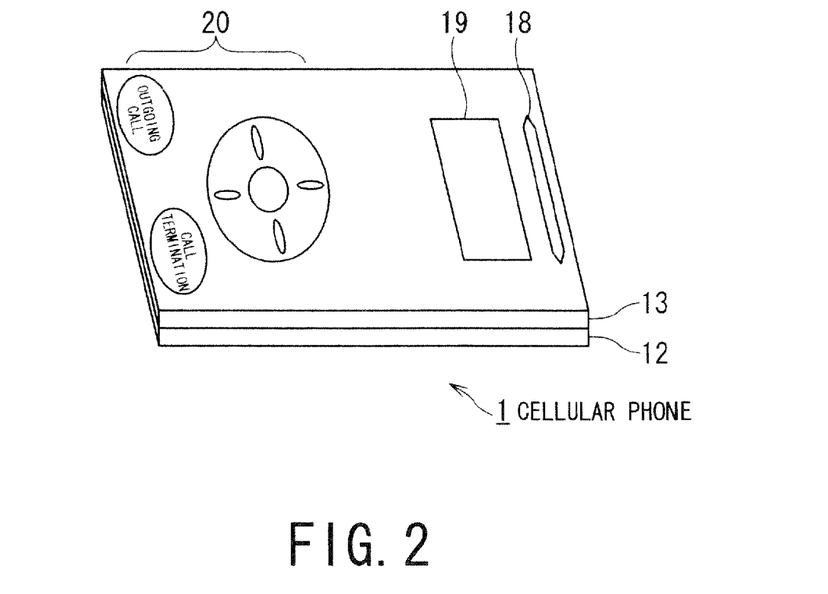
FIG. 2 illustrates another external configuration of the cellular phone which can be applied to the information processing apparatus according to an embodiment of the present invention.

FIG. 2 illustrates another external configuration of the cellular phone 1 which can be applied to the information processing apparatus according to the embodiment of the present invention. A state of the cellular phone 1 in FIG. 2 refers to a state in which the cellular phone 1 is turned from the state in FIG. 1 in an arrow X direction (the closed state). It should be noted that FIG. 2 illustrates an external configuration of the cellular phone 1 closed as viewed from the front.

At a predetermined upper part of the second casing 13, a receiver (earpiece) 18 is provided. With this configuration, the user can perform the voice conversation. It should be noted that a speaker (not shown) as an speech output unit other than a receiver 18 is provided at a predetermined position of the cellular phone 1.

At a lower part of the receiver 18, a sub display 19 is provided. An antenna pictogram indicating the current antenna sensitivity, a battery pictogram indicating the current battery remaining amount of the cellular phone 1, the current time, numerals etc., which input along the operations by the user are displayed on the sub display 19. In addition, at predetermined positions of the second casing 13, second operation keys 20 composed of an arrow key, a decision key, and the like. As a user operates the arrow key in up, down, left, and right directions, an allocated cursor can be moved in the up, down, left, and right directions.

Furthermore, an outgoing call key is provided as the second operation key on the left of the arrow key and the decision key, and also a call termination is provided as the second operation key on the right of the arrow key and the decision key. When the outgoing call key is pressed after the telephone number is confirmed through the operations of the arrow key and the decision key performed by the user, an outgoing call processing is performed with respect to the confirmed telephone number.

Figure 3:
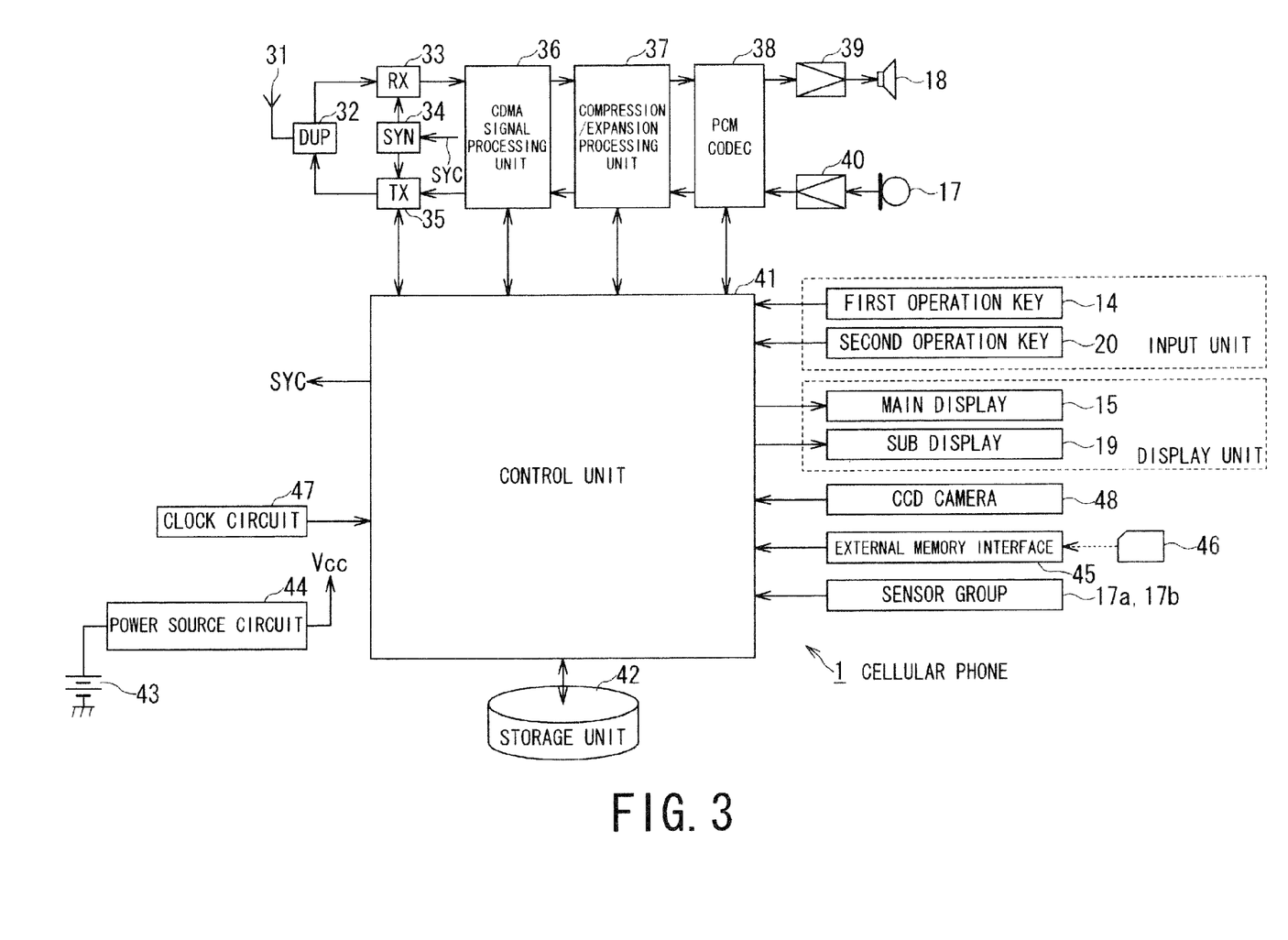
FIG. 3 is a block diagram of an internal configuration of the cellular phone which can be applied to the information processing apparatus according to an embodiment of the present invention.

FIG. 3 illustrates an inner configuration of the cellular phone 1 which can be applied to the information processing apparatus according to the embodiment of the present invention. A radio signal transmitted from the base station is received by the antenna 31, and thereafter input to a reception circuit (RX) 33 via an antenna duplexer (DUP) 32. The reception circuit 33 may perform mixing of the received radio signal with a local oscillator signal output from a frequency synthesizer (SYN) 34. The reception circuit 33 down-convert a frequency conversion to generate an intermediate frequency signal. Then, the reception circuit 33 performs a quadrature demodulation (quadrature detection) on this down-converted intermediate frequency signal to output a reception baseband signal. It should be noted that the frequency of the local oscillator signal generated from the frequency synthesizer 34 is instructed on the basis of a control signal SYC output from a control unit 41.

The reception baseband signal from the reception circuit 33 is input to a CDMA signal processing unit 36. The CDMA signal processing unit 36 is provided with a RAKE receiver which is not shown in the drawing. In this RAKE receiver, a plurality of paths included in the reception baseband signal are subjected to a despreading processing with the respective spread codes (that is, the same spread code as the spread code of the spread reception signal). Then, after the phase is adjusted, the despread signal of the respective paths is coherently RAKE combined by a coherent RAKE combiner which is not shown. The data series after the Rake combining is subjected to deinterleave and channel decoding (error correction decoding), and thereafter a binary data determination is carried out. With this configuration, it is possible to obtain reception packet data with use of a predetermined transmission format. This reception packet data is input to a compression/expansion processing unit 37.

The compression/expansion processing unit 37 is composed of a DSP (Digital Signal Processor). The compression/expansion processing unit 37 may separate the reception packet data output from the CDMA signal processing unit 36 in a multiple separation unit in the drawing for each media, and perform a decoding processing on the separated data for each media. For example, in the conversation mode, speech data corresponding to the conversation voice or the like included in the reception packet data is decoded by way of speech codec. Also, for example, in case of a television telephone mode, when motion picture data is included in the reception packet data, this motion picture data is decoded by way of video codec. Furthermore, when the reception packet data is a download content, after this download content is expanded, the expanded download content is output to the control unit 41.

The digital speech signal obtained through the decoding processing is supplied to a PCM codec 38. The PCM codec 38 may perform a PCM decoding on the digital speech signal output from the compression/expansion processing unit 37 and output the analog speech data after the PCM decoding to a receiver amplifier 39. This analog speech signal is amplified by the call receiver amplifier 39 and thereafter output from the receiver 18.

The digital motion picture signal decoded by way of the video codec through the compression/expansion processing unit 37 is input to the control unit 41. The control unit 41 displays the motion picture based on the digital motion picture signal output from the compression/expansion processing unit 37 on the main display 15 via a video RAM (for example, a VRAM or the like) which is not shown. It should be noted that the control unit 41 can display not only the received motion picture data but also the motion picture data picked up by the CCD camera 48 on the main display 15 via the video RAM.

Also, in a case where the reception packet data is the electronic mail, the compression/expansion processing unit 37 supplies this electronic mail to the control unit 41. The control unit 41 instructs a storage unit 42 to store the electronic mail supplied from the compression/expansion processing unit 37. Then, in accordance with the operation by the user on the first operation keys 14 as the input unit, the control unit 41 reads out this electronic mail stored in the storage unit 42 and displays the read electronic mail on the main display 15.

On the other hand, in the conversation mode, the speech signal (analog speech signal) of the speaker (user) which is input to the microphone 16 is amplified to an appropriate level by a transmitter amplifier 40, and then PCM-encoded by the PCM codec 38. The digital speech signal after the PCM encoding is input to the compression/expansion processing unit 37. Also, the motion picture signal output from the CCD camera 48 is digitalized by the control unit 41 to be input to the compression/expansion processing unit 37. Furthermore, the electronic mail as text data which is generated in the control unit 41 is also input to the compression/expansion processing unit 37.

The compression/expansion processing unit 37 may perform a compression encoding on the digital speech signal output from the PCM codec 38 in a format in accordance with a predetermined transmission data rate. With this configuration, the speech data is generated. Also, the compression/expansion processing unit 37 performs a compression encoding on the digital motion picture signal output from the control unit 41 to generate the motion picture data. Then, the compression/expansion processing unit 37 multiplexes the speech data and the motion picture data in the multiple separation unit in accordance with a predetermined transmission format, and packetizes the data. After that, the compression/expansion processing unit 37 outputs the transmission packet data after the packetization to the CDMA signal processing unit 36. It should be noted that also in a case where the electronic mail is output from the control unit 41, the compression/expansion processing unit 37 multiplexes this electronic mail into the transmission packet data.

The CDMA signal processing unit 36 may use a spread code allocated to the transmission channel to perform a spread spectrum processing on the transmission packet data output from the compression/expansion processing unit 37. Then, the CDMA signal processing unit 36 outputs the output signal after the spread spectrum processing to a transmission circuit (TX) 35. The transmission circuit 35 modulates the signal after the spread spectrum processing by using a digital modulation system such as a QPSK (Quadrature Phase Shift Keying) method. The transmission circuit 35 synthesizes the transmission signal after the digital modulation with the local oscillator signal generated from the frequency synthesizer 34 to perform a frequency conversion (up convert) on the radio signal. Then, the transmission circuit 35 performs a high frequency amplification on the radio signal generated through this up convert so as to obtain the transmission power level which is instructed by the control unit 41. This wireless signal having been subjected to the high frequency amplification is supplied to the antenna 31 via the antenna duplexer 32 and transmitted from the antenna 31 to the base station.

In addition, the cellular phone 1 is provided with an external memory interface 45. The external memory interface 45 is provided with a slot to which the memory card 46 can be detachably attached. The memory card 46 is one type of flash memory cards represented by a NAND type flash memory card, a NOR type flash memory card, and the like. In the memory card 46, write and read of various data such as images, speech, and music can be performed via a ten-pin terminal. Furthermore, the cellular phone 1 is provided with a clock circuit (timer) 47 for measuring the current time.

The control unit 41 is composed of a CPU (Central Processing unit), a ROM (Read Only Memory), a RAM (Random Access Memory), and the like. The CPU executes various processings while following programs stored in the ROM or various application programs loaded from the storage unit 42 to the RAM, and also generates various control signals to be supplied to the respective units, thus controlling the cellular phone 1 in an overall manner. The RAM appropriately stores data necessary for the CPU to execute the various processings.

The storage unit 42 is composed, for example, of a flash memory which is a non-volatile memory in which electrical rewrite and deletion can be performed, an HDD (Hard Disc Drive), or the like. The storage unit 42 stores the various application programs to be executed by the CPU of the control unit 41 or various data groups. A power source circuit 44 generates a predetermined operation power source voltage Vcc on the basis of the output of a battery 43 to be supplied to the respective circuit units.

Next, with reference to a flowchart of FIG. 4, the outgoing call processing in the cellular phone 1 of FIG. 3 will be described. It should be noted that this cellular phone 1 is started when the outgoing call key provided at a predetermined position of the second casing 13 among the second operation keys 20 is pressed by the user in a state where the cellular phone 1 is closed.

In step S1, by monitoring the operation of the second operation keys 20, the control unit 41 determines whether the outgoing call key provided at the predetermined position of the second casing 13 which functions as the second operation key 20 is pressed by the user in a state where the cellular phone 1 is closed. The processing stands by until it is determined that the outgoing call key provided at the predetermined position of the second casing 13 is pressed by the user in a state where the cellular phone 1 is closed.

In step S1, in a case where it is determined that the outgoing call key provided at the predetermined position of the second casing 13 which functions as the second operation key 20 is pressed by the user in a state where the cellular phone 1 is closed, in step S2, the control unit 41 controls the sub display 19 to display a plurality of input numeral keys on an input numeral key display area of the sub display 19. The sub display 19 displays plurality of input numeral keys on the input numeral key display area of the sub display 19 in accordance with the control of the control unit 41.

Figure 5A:
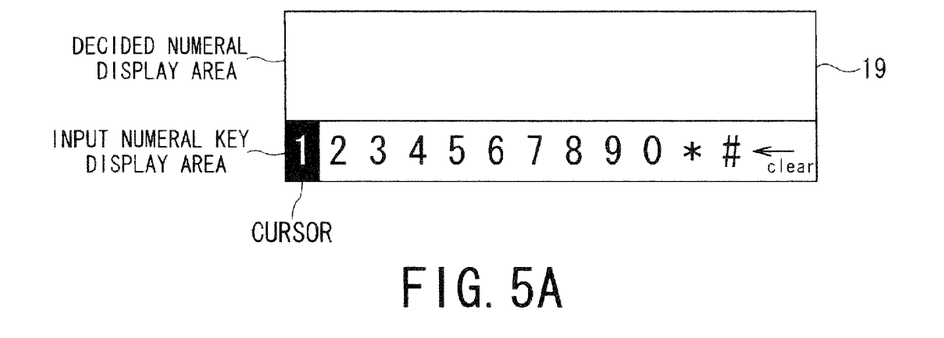
FIGS. 5A and 5B illustrate display examples displayed on a sub display of FIG. 3.

For example, as illustrated in FIG. 5A, in a display area at a lower part of the sub display 19, an input numeral key display area for display the input numeral keys which are to be input in the outgoing call processing is provided. In the case of the example illustrated in FIG. 5A, "1", "2", "3", . . . , "*", "#", "←Clear" are displayed on the input numeral key display area. A cursor is currently located at "1" among these input numeral keys, and "1" is inverted to be displayed as an outlined character. This represents that the input numeral key "1" is a target currently selected through the decision operation.

In step S3, the control unit 41 determines whether as the arrow key among the second operation keys 20 is operated by the user and either a left or right key among the arrow key is pressed. In step S3, in a case where it is determined that either the left or right key among the arrow key is pressed (that is, in a case where a left key or a right key among the arrow key is pressed), while following either the pressed left or right key among the arrow key, in step S4, the control unit 41 moves the cursor display in the input numeral key display area of the sub display 19.

Figure 5B:
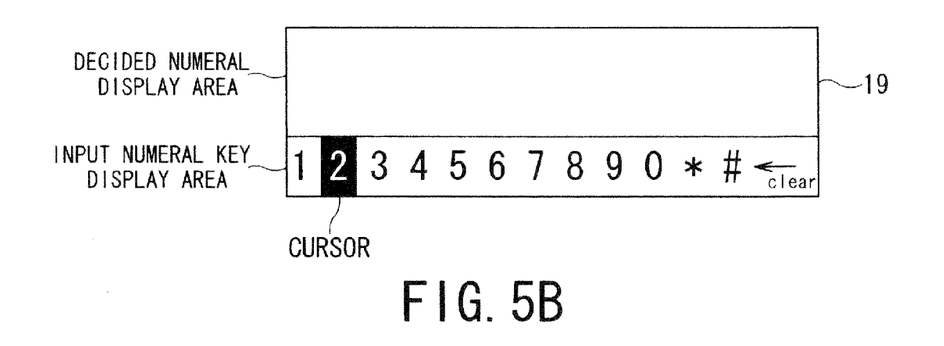

For example, in the case of FIG. 5A, when the right key among the arrow key is pressed by the user, as illustrated in FIG. 5B, the cursor display in the input numeral key display area of the sub display 19 is moved from the current location "1" to "2".

On the other hand, in step S3, in a case where it is determined that either the left or right key among the arrow key is not pressed, the processing in step S4 is skipped, and the cursor currently displayed in the input numeral key display area of the sub display 19 is not moved.

In step S5, the control unit 41 determines whether a decision key among the second operation keys 20 is pressed by the user. In step S5, in a case where it is determined that the decision key among the second operation keys 20 is not pressed by the user, the processing is returned to step S3, and the processing in step S3 and subsequent steps is repeatedly executed. With this configuration, in the case of FIG. 5B, when the right key among the arrow key is further pressed by the user, the cursor display in the input numeral key display area of the sub display 19 is moved from the current location "2" to "3".

In step S5, in a case where it is determined that the decision key among the second operation keys 20 is pressed by the user, while following the press of the control unit 41 decision key among the second operation keys 20 by the user, in step S6, the control unit 41 accepts the input of the input numeral key which is the target currently selected through the decision operation and decides the accepted input of the input numeral key. For example, in the case of FIG. 5A, when the decision key among the second operation keys 20 is pressed by the user, the input of the input numeral key "1" which is the target currently selected through the decision operation is accepted, and the input of this input numeral key "1" is decided.

It should be noted that after the user operates the arrow key among the second operation keys 20 and the input numeral key which is the target currently selected through the decision operation is set at "←Clear", when the decision key among the second operation keys 20 is pressed by the user, the decided numeral based on the input numeral key whose input has been decided immediately before (the decided numeral displayed in a decided numeral display area) is deleted (cleared). With this configuration, the decided numeral erroneously decided is deleted, and it is possible to input a new numeral key again to decide the numeral as the decided numeral.

In step S7, the control unit 41 controls the sub display 19 to display the decided numeral based on the input numeral key whose input has been decided in the processing in step S6 in the decided numeral display area of the sub display 19. While following the control of the control unit 41, the sub display 19 displays the decided numeral based on the input numeral key whose input has been decided in the processing in step S6 in the decided numeral display area of the sub display 19.

Figure 6A:
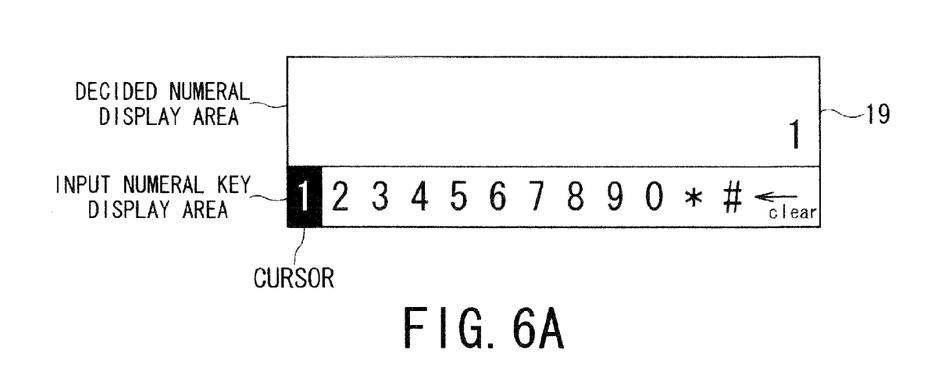
FIGS. 6A and 6B illustrate display examples displayed on the sub display of FIG. 3.

For example, in the case of FIG. 5A, when the decision key among the second operation keys 20 is pressed by the user, as illustrated in FIG. 6A, the decided numeral "1" based on the input numeral key whose input has been decided is displayed in the decided numeral display area of the sub display 19.

In step S8, the control unit 41 determines whether as the user operates the second operation keys 20, the outgoing call key among the second operation keys 20 is pressed. In step S8, in a case where it is determined that the outgoing call key among the second operation keys 20 is not pressed, the processing is returned to step S3, and the processing in step S3 and subsequent steps is repeatedly run.

Figure 6B:
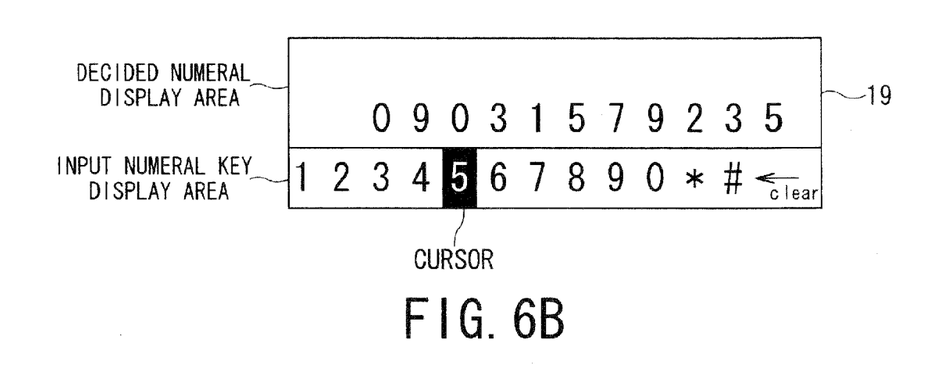

With this configuration, for example, as the user operates the second operation keys 20, when inputs of the input numeral keys "0", "9", "0", "3", "1", "5", "7", "9", "2", "3", and "5" are accepted and decided, as illustrated in FIG. 6B, the decided numerals "09031579235" is displayed in the decided numeral display area of the sub display 19.

On the other hand, in step S8, in a case where it is determined that the outgoing call key among the second operation keys 20 is pressed, in step S9, the control unit 41 performs the outgoing call processing via the antenna 31, the antenna duplexer 32, a transmission circuit 35, and the like to another cellular phone 1 which is identified by the telephone number corresponding to the input numeral keys which have been already input by the user. For example, in the case of FIG. 6B, the outgoing call processing is executed to another cellular phone 1 which is identified by the telephone number corresponding to the input numerals "09031579235".

According to the embodiment of the present invention, the cellular phone 1 is provided with the first casing 12 and the second casing 13 which is hinge-connected to the first casing 12 via the hinge part 11. In a state where the first casing 12 and the second casing 13 are closed, a plurality of input numeral keys are displayed on a first display area (the input numeral key display area). From the plurality of input numeral keys displayed in the first display area, inputs of some input numeral keys are accepted, and the accepted inputs of the input numeral keys are decided. Then, it is possible to carry out the outgoing call to another cellular phone 1 which is identified by a combination of the decided numerals based on the input numeral keys whose inputs have been decided.

With this configuration, the user does not need to perform opening/closing of the cellular phone at least one time at the time of the outgoing call or conversation. Even in a case where the foldable style cellular phone 1 as the data terminal is in the closed state, it is possible to easily carry out the outgoing call or incoming call processing by using the second operation keys 20. Therefore, it is possible to improve the usability for carrying out the outgoing call or incoming call (conversation) processing by using the foldable style cellular phone 1 as the data terminal.

Figure 4:
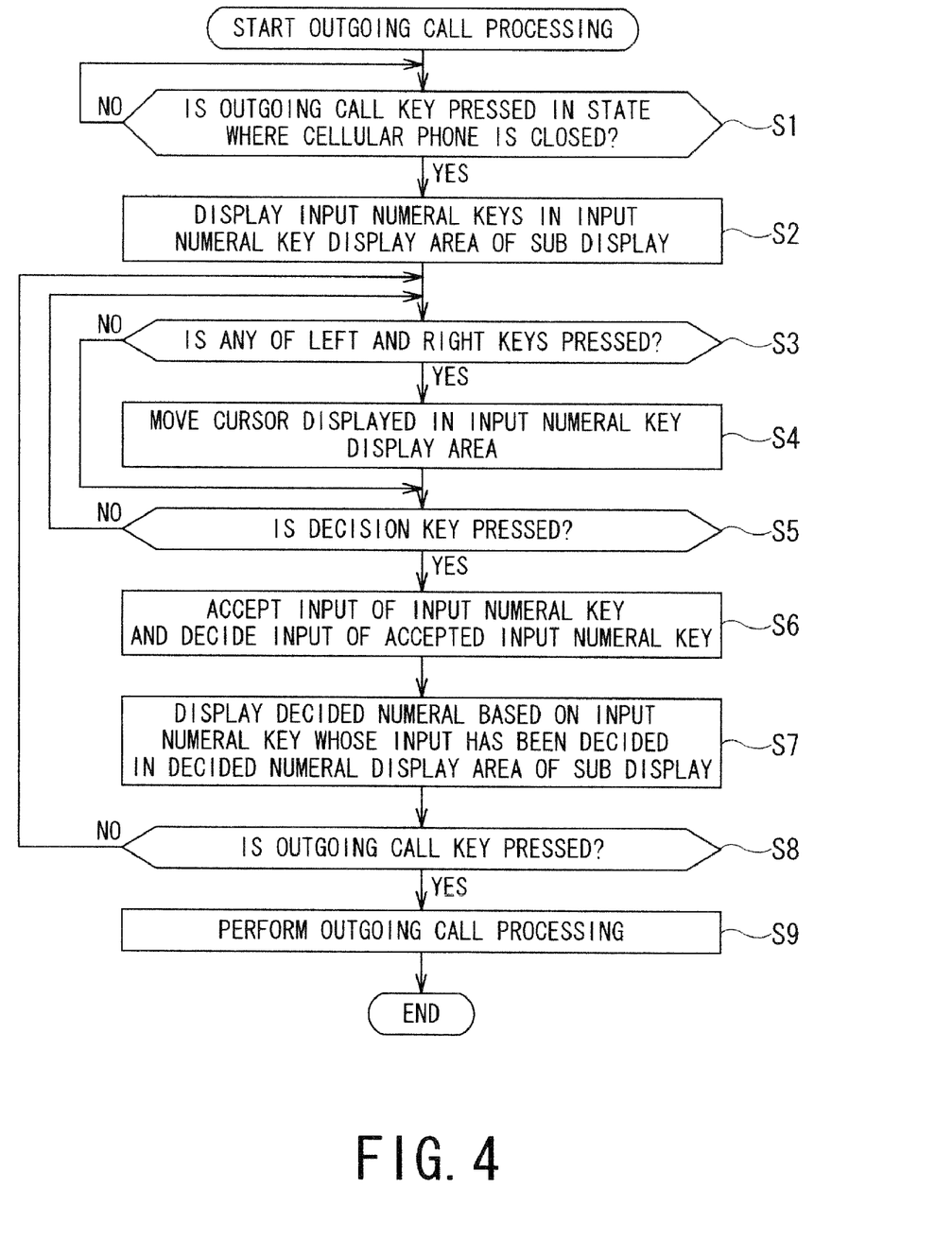
FIG. 4 is a flowchart for describing an outgoing call processing in the cellular phone of FIG. 3.
Figure 7A:
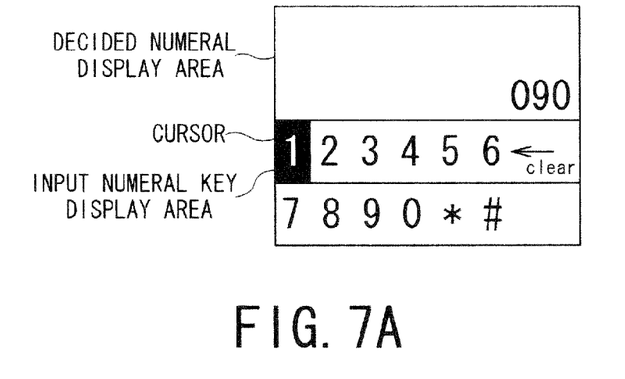
FIGS. 7A to 7C illustrate a dial display format example of input numeral keys displayed on an input numeral key display area of the sub display of FIG. 3.
Figure 7B:
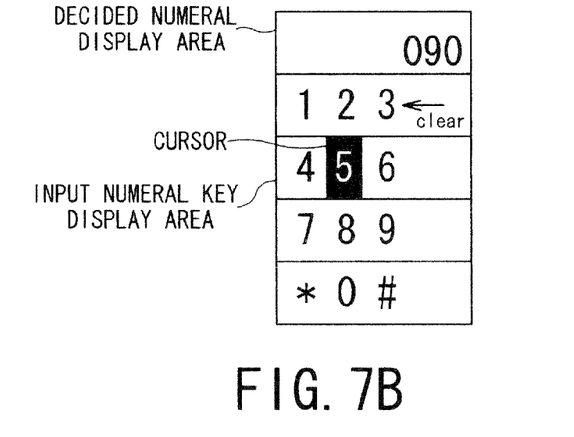
Figure 8:
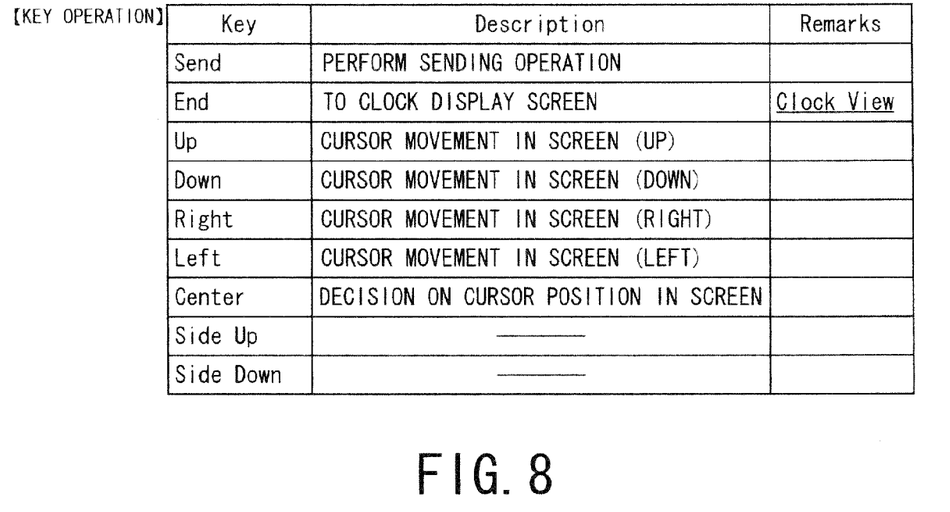
FIG. 8 illustrates a correspondence relation example between second operation keys and operations corresponding to the operations performed by a user at the time of the outgoing call processing.

It should be noted that in the outgoing call processing described with use of the flowchart of FIG. 4, the display screen of the sub display 19 having a dial display format illustrated in FIGS. 5A, 5B, 6A, and 6B is used, but the present invention is not limited to the above-described case. In accordance with the display area of the sub display 19, for example, as illustrated in FIG. 7A, the dial display format for displaying the input numeral keys in the input numeral key display area of the sub display 19 may be a two-stage display method instead of the one-stage display method. Also, for example, as illustrated in FIG. 7B, the dial display method for displaying the input numeral keys in the input numeral key display area of the sub display 19 may also be a three or more stage display method. Such a dial display method may also be appropriately changed in accordance with a preference of the user. It should be noted that FIG. 8 illustrates a correspondence relation example between the second operation keys 20 and operations corresponding to the second operation keys performed by the user at the time of the outgoing call processing illustrated in the flowchart of FIG. 4.

Figure 9:
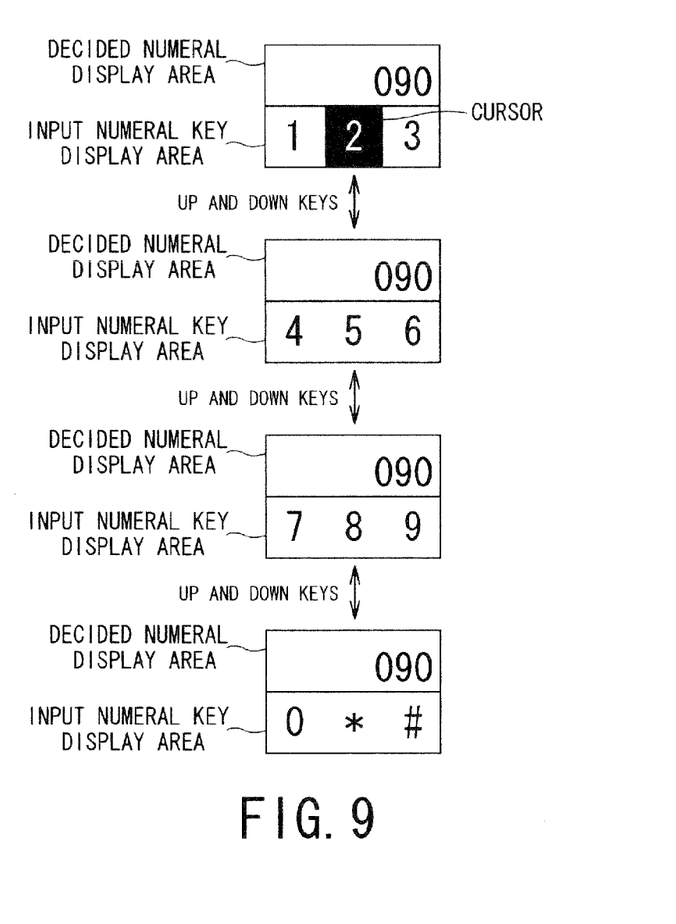
FIG. 9 illustrates a dial display format example of the input numeral keys displayed on the input numeral key display area of the sub display of FIG. 3.

Furthermore, as illustrated in FIG. 9, the input numeral keys displayed in the input numeral key display area of the sub display 19 are divided for groups of some numerals, and in accordance with an operation of an upper or lower key of the arrow key among the second operation keys 20 performed by user, the input numeral keys displayed in the input numeral key display area may be transited. With this configuration, the number of troublesome tasks for the user when the telephone number is input in the outgoing call processing by using the second operation keys 20 is reduced, and even when the display area of the sub display 19 is small, it is possible to easily input the telephone number.

Figure 10:
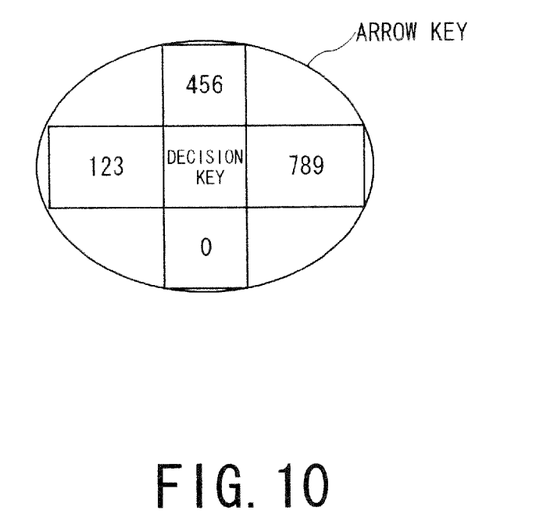
FIG. 10 is an explanatory diagram for describing input numerals allocated to an arrow key of the second operation key of FIG. 3.

Also, as illustrated in FIG. 10, input numerals such as "123", "456", "789", and "0", are allocated to up, down, left, and right keys existing in the arrow key among the second operation keys 20 provided to the second casing 13. Following any of the keys of the arrow key pressed by the user (any of the up, down, left, and right keys), the cursor in the input numeral key display area is moved, and the input numeral keys may be input and decided. For example, in the case of inputting "080-1234-5678", the input is carried out in the following manner: down o decision key→right twice→decision key→down→decision key (080) →left→decision key→left twice→decision key→left three times→decision key→up→decision key (1234)→up twice→decision key→up three times→right→decision key→right twice→decision key (5678).

It should be noted that according to the embodiment of the present invention, in a state where the cellular phone 1 is closed, the outgoing call processing is carried out by pressing the outgoing call key among the second operation keys 20, but the present invention is not limited to the above-described case. For example, the outgoing call processing may be carried out by pressing the decision key among the second operation keys 20 for a long period of time. With this configuration, it is possible to reduce the number of operation keys provided to the second casing 13.

Figure 7C:
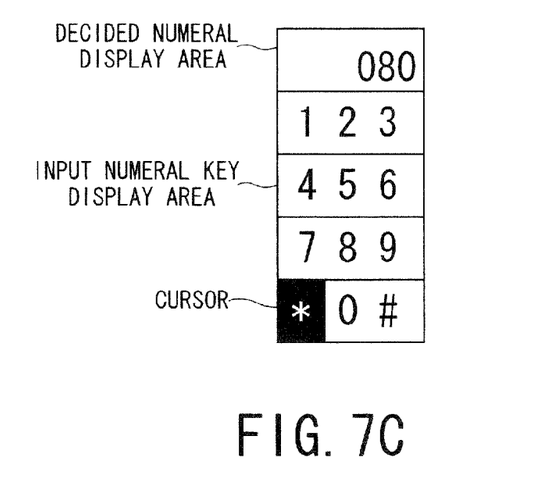
Figure 11:
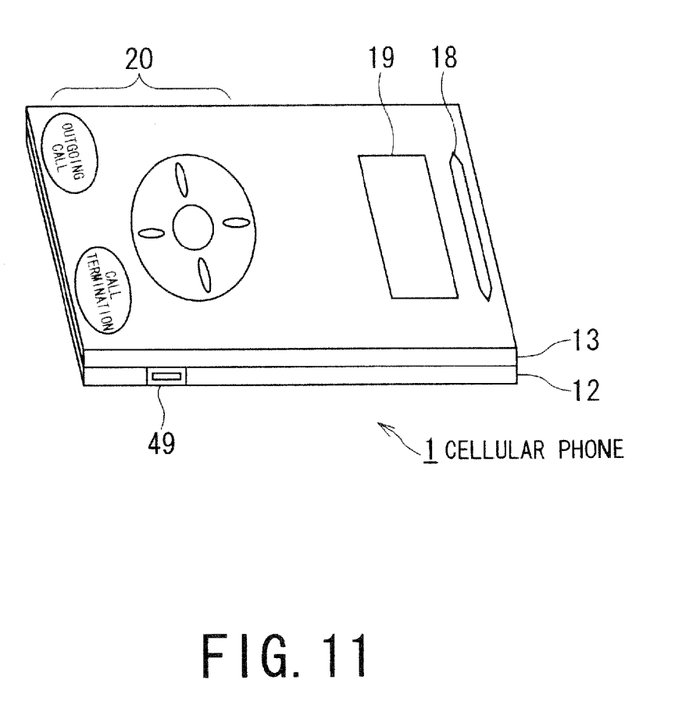
FIG. 11 illustrates another external configuration of the cellular phone which can be applied to the information processing apparatus according to an embodiment of the present invention.

Incidentally, by using a fingerprint sensor (a semiconductor sensor of a semiconductor system, an optical system, or the like) provided from a viewpoint of security, etc., a particular finger is allocated with the moving direction of the cursor in advance for setting. On the basis of a type of the finger directed by the fingerprint sensor and the number of taps, the cursor displayed in the input numeral key display area is moved, and the telephone number may be input. At this time, for example, as illustrated in FIG. 11, a fingerprint sensor 49 for authenticating the finger of the user is provided, for instance, on a side face of the first casing 12. Also, for example, the following setting is previously established: 1. the moving direction of the cursor allocated to the right thumb of the user is the "right" direction, 2. the moving direction of the cursor allocated to the left index finger of the user is the "left" direction. Of course, the "left and right" directions may be allocated to other fingers. Furthermore, for example, the dial display format illustrated in FIG. 7C is used.

To be more specific, in a case where the input numeral keys are input and decided by using the fingerprint sensor 49, for example, when "080-1234-5678" is input, if the current cursor location is at "*", the input is carried out in the following manner: 1. right thumb×once (0), 2. left index finger×three times (8), 1. right thumb×three times (0), 1. right thumb× twice (1), 1. right thumb×once (2), 1. right thumb×once (3), 1. right thumb×once (4), 1. right thumb×once (5), 1. right thumb×once (6), 1. right thumb×once (7), 1. right thumb× once (8). It should be noted that in the case of the input of the input numeral keys using the fingerprint sensor 49 described above, the decision operation by way of the decision key is omitted for simplification.

It should be noted that in the outgoing call processing described by using the flowchart of FIG. 5, the outgoing call and conversation processing is carried out by using the second operation keys 20 in a state where the foldable style cellular phone 1 as the data terminal is closed. However, the cellular phone 1 is put in the opened state once, and after the telephone number is input by using the first operation keys 14 provided to the first casing 12, or, in the course of the input, the cellular phone 1 is put in the closed state. Then, by using the second operation keys 20 provided to the second casing 13, the outgoing call processing may be carried out. With this configuration, for example, in a case where the telephone number of the intended party is input while a telephone directory is checked with, the telephone number is input until the last digit or partway by using the first operation keys 14 once. Then, the cellular phone 1 is put in a state where the calling is facilitated, and the outgoing call processing. Hereinafter, the outgoing call processing using this method will be described.

Figure 12:
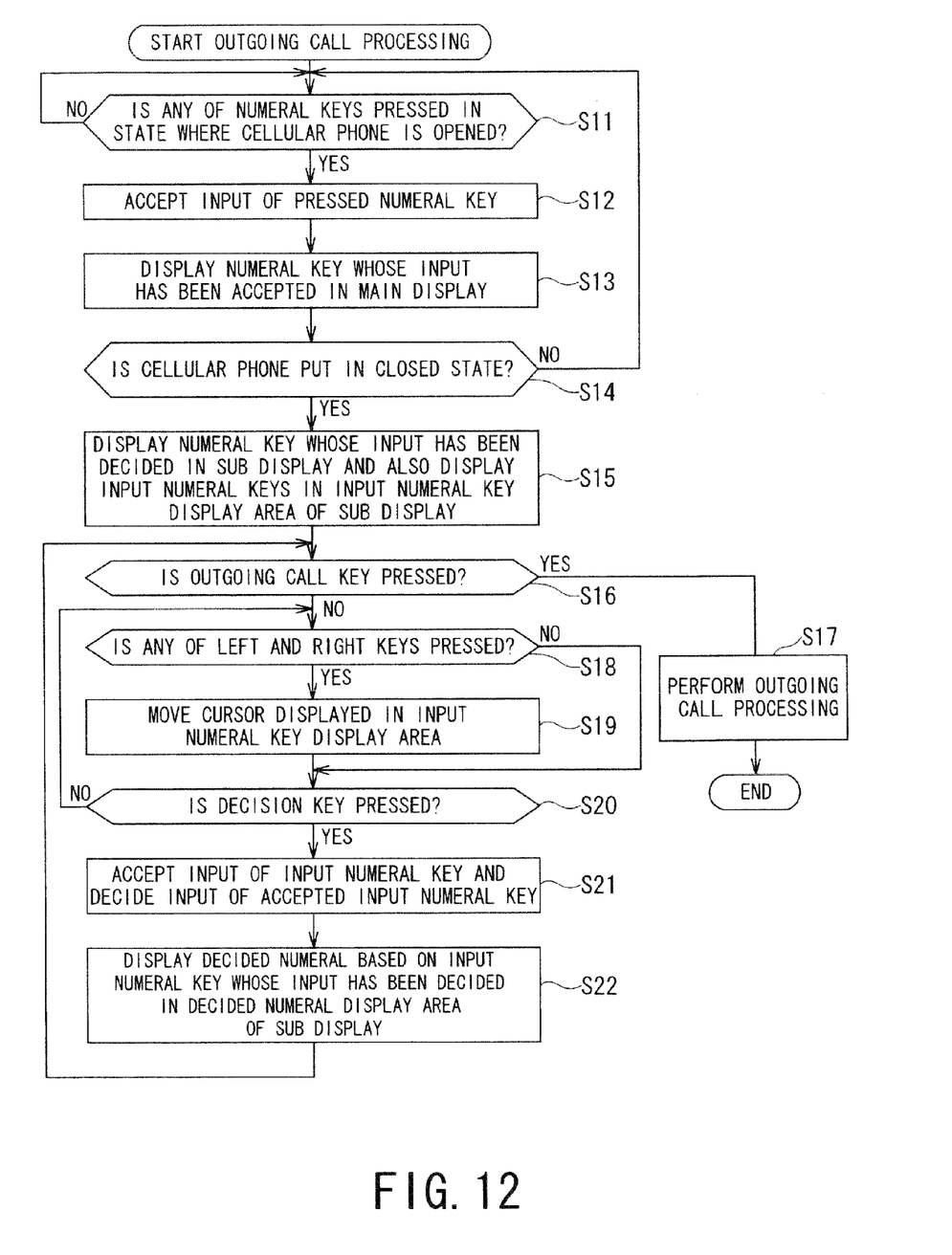
FIG. 12 is a flowchart for describing another outgoing call processing in the cellular phone of FIG. 3.

With reference to a flowchart of FIG. 12, another outgoing call processing in the cellular phone 1 of FIG. 3 will be described. It should be noted that a processing in steps S18 to S22 of FIG. 12 are basically similar to the processing in steps S3 to S7 of FIG. 4, and a description thereof will be omitted to avoid the repetition.

In step S11, by monitoring operations of the first operation keys 14, the control unit 41 determines whether any of numeral keys among the first operation keys 14 provided at predetermined locations of the first casing 12 is pressed by the user in a state in which the cellular phone 1 is opened. The processing stands by until it is determined that any of numeral keys among the first operation keys 14 provided at predetermined locations of the first casing 12 is pressed by the user in a state in which the cellular phone 1 is opened.

In step S11, in a case where it is determined that any of numeral keys among the first operation keys 14 provided at predetermined locations of the first casing 12 is pressed by the user in a state in which the cellular phone 1 is opened, in step S12, the control unit 41 accepts the input of the pressed numeral key. In step S13, the control unit 41 controls the main display 15 to display the numeral key whose input has been accepted on the main display 15. The main display 15 displays the numeral key whose input has been accepted while following the control of the control unit 41.

In step S14, the control unit 41 uses the magnetic sensors 17a and 17b to determine whether the cellular phone 1 is in the closed state. In step S14, in a case where it is determined that the cellular phone 1 is not in the closed state, the processing is returned to step S11, and the processing in step S11 and subsequent steps is repeatedly executed. With this configuration, as the user operates the first operation keys 14, for example, the telephone number "09031579235" or the like is input.

In step S14, in a case where it is determined that the cellular phone 1 is in the closed state, in step S15, the control unit 41 controls the sub display 19 to display the numeral key whose input has been already accepted (for example, "09031579235" or the like) in the decided numeral display area of the sub display 19, and also to display a plurality of input numeral keys in the input numeral key display area of the sub display 19.

In step S16, as the user operates the second operation keys 20, the control unit 41 determines whether the outgoing call key among the second operation keys 20 is pressed. In step S16, in a case where it is determined that the outgoing call key among the second operation keys 20 is pressed, the processing is advanced to step S17. In step S17, the outgoing call processing is executed. With this configuration, after the telephone number is input until the last digit by using the first operation keys 14, the outgoing call processing can be started while the cellular phone 1 is put in a state where the calling is facilitated.

On the other hand, in step S16, in a case where it is determined that the outgoing call key among the second operation keys 20 is not pressed, the processing is advanced to step S18. Then, the processing in step S18 and subsequent steps is executed. With this configuration, for example, by the first operation keys 14, the telephone number is input until the last digit. However, in a case where the user desires to correct the numeral key displayed in the decided numeral display area of the sub display 19, a deletion processing is executed after the cursor is moved to "←Clear", and a new input numeral key is input and decided. Then, in step S17, the outgoing call processing is executed. Also, for example, the processing is similar to the case where the telephone number is input only partway by using the first operation keys 14.

With this configuration, at the time of the outgoing call or conversation, opening/closing of the cellular phone needs to be performed once, but in a case where the foldable style cellular phone 1 as the data terminal is put in the closed state, it is possible to continue carrying out the outgoing call and conversation processing by using the second operation keys 20. Therefore, it is possible improve the usability at the time of carrying out the outgoing call and conversation processing with use of the foldable style cellular phone 1 as the data terminal.

Figure 13:
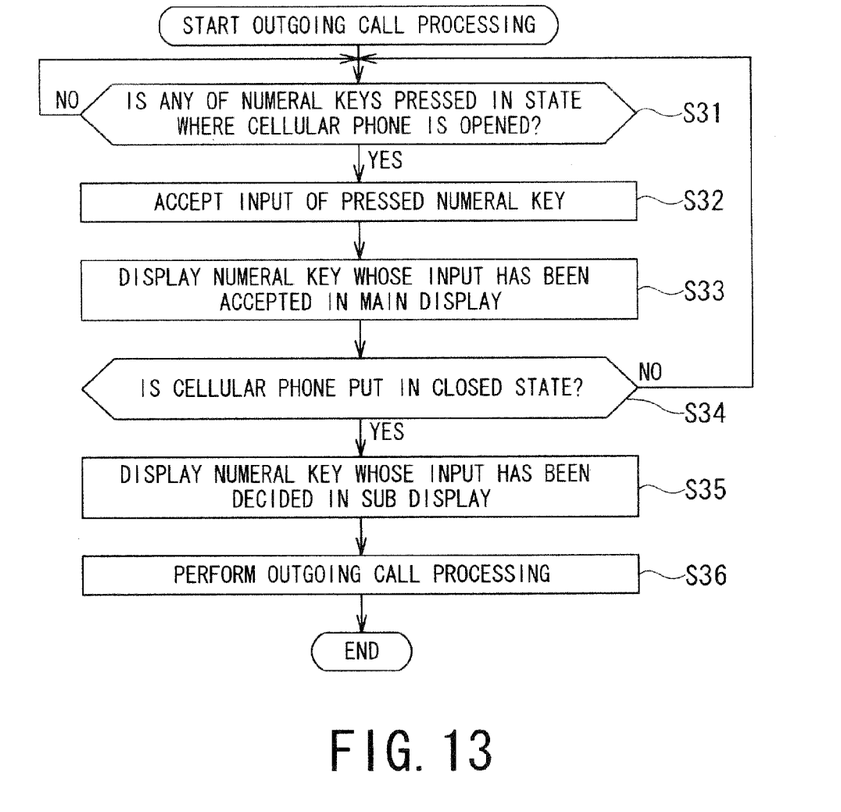
FIG. 13 is a flowchart for describing another outgoing call processing in the cellular phone of FIG. 3.

It should be noted that as illustrated in a flowchart of FIG. 13, in step S34, in a case where it is determined that the cellular phone 1 is put in the closed state, this situation is used as a trigger for the outgoing call processing, and the outgoing call processing to the input telephone number may also be executed immediately in step S36. With this configuration, it is possible further improve the usability at the time of carrying out the outgoing call and conversation processing with use of the foldable style cellular phone 1 as the data terminal.

Figure 14:
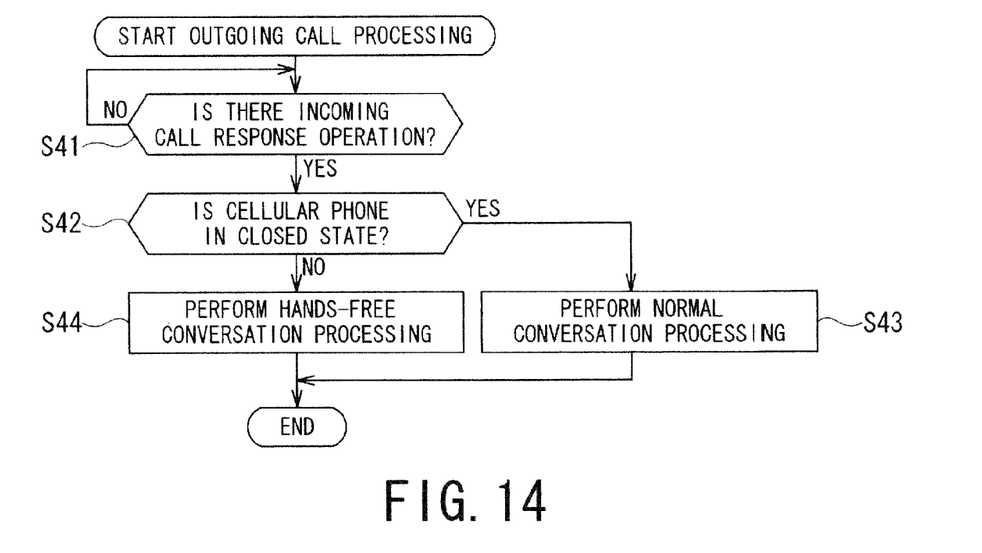
FIG. 14 is a flowchart for describing a conversation processing in the cellular phone of FIG. 3.

Incidentally, when an incoming call is received from another cellular phone 1 in a state where the cellular phone 1 is closed, the user can start the conversation immediately without changing the state. However, in a state where the cellular phone 1 is in the opened state, it is necessary to close the cellular phone 1 once. In view of the above, for example, as illustrated in a flowchart of FIG. 14, in step S41, in a case where the control unit 41 determines that there is an incoming call response operation to an incoming call from another cellular phone 1 via the antenna 31, the reception circuit 33, and the like (that is, in a case where the user presses a conversation button or the like when the incoming call is received from another cellular phone 1), in step S42, the control unit 41 uses the magnetic sensors 17a and 17b to determine whether the cellular phone 1 is in the closed state. In step S42, in a case where it is determined that the cellular phone 1 is in the closed state, in step S43, the control unit 41 executes a normal conversation processing via the antenna 31, the reception circuit 33, the transmission circuit 35, and the like. On the other hand, in step S42, in a case where it is determined that the cellular phone 1 is in the opened state, in step S44, the control unit 41 executes a hands-free conversation processing via the antenna 31, the reception circuit 33, the transmission circuit 35, and the like.

With this configuration, it is possible further improve the usability at the time of carrying out the conversation processing with use of the foldable style cellular phone 1 as the data terminal.

It should be noted that of course, the respective processings described in the specification may be combined appropriately.

Also, it should be noted that in addition to the cellular phone 1, the present invention can also be applied to other information processing apparatuses such as a PDA (Personal Digital Assistant), a personal computer, a portable game player, a portable music player, and a portable video player.

Moreover, the series of processings described according to the embodiment of the present invention can be executed by using software but also executed by using hardware.

Furthermore, according to the embodiments of the present invention, such a processing example has been described that the steps of the flowcharts are processed in a time series manner in the stated order, but the present invention also encompasses a processing in which the steps are not necessarily processed in the time series manner and the steps are processed in a parallel manner or individually processed.

What is claimed is:

1. An information processing apparatus, comprising:
a first casing having a width and a length that is longer than the width;
a second casing which is hinge-connected to the first casing along the longer length of the first casing via a hinge part;
a display unit which is provided to the second casing, the display unit being exposed to an outside when the first casing and the second casing are in a closed state, the display unit being configured to display a plurality of input numeral keys in a first display area of the display unit when the first casing and the second casing are in the closed state;
a decision unit configured to accept an input of any of the input numeral keys displayed in the first display area using a cursor moved through pressing of up, down, left, and right keys provided to the second casing or moved by a fingerprint sensor provided to one of the first casing and the second casing and decide the input of the accepted input numeral key upon pressing of a decision key provided to the second casing; and
an outgoing call unit configured to perform an outgoing call to another information processing apparatus when the first casing and the second casing are in the closed state, said another information processing apparatus being identified by a combination of the decided numerals based on the input numeral keys whose inputs are decided by the decision unit via a network in accordance with a press of an outgoing call key provided to the second casing;

wherein the display unit is further configured to display in a second display area of the display unit a combination of numerals input and decided when the first casing and the second casing are in an opened state and the decided numerals whose inputs are decided by the decision unit when the first casing and the second casing are in the closed state.

2. The information processing apparatus according to claim 1, wherein the outgoing call unit performs the outgoing call to said another information processing apparatus after the inputs of the input numeral keys are accepted in a state where the first casing and the second casing are opened and once the first casing and the second casing are put in the closed state from the opened state.

3. The information processing apparatus according to claim 1, wherein in a case where the display unit displays the plurality of input numeral keys in the first display area, the input numeral keys are arranged in a predetermined displayed method and displayed.

4. The information processing apparatus according to claim 3, wherein the input numeral keys are arranged in multiple-stage method and displayed.

5. The information processing apparatus according to claim 3, wherein the outgoing call unit performs the outgoing call to said another information processing apparatus after the inputs of the input numeral keys are accepted in a state where the first casing and the second casing are opened and once the first casing and the second casing are put in the closed state from the opened state.

6. The information processing apparatus according to claim 1, wherein in a case where the display unit displays the plurality of input numeral keys in the first display area, the input numeral keys are arranged in multiple pieces and displayed.

7. The information processing apparatus according to claim 6, wherein the inputs of the input numeral keys are accepted in a state where the first casing and the second casing are opened and once the first casing and the second casing are put in the closed state from the opened state.

8. The information processing apparatus according to claim 1, further comprising: a conversation unit adapted to perform a hands-free conversation processing when the first casing and the second casing are in the opened state in a case where an incoming call response operation is activated in response to an incoming call from said another information processing apparatus.

9. The information processing apparatus according to claim 1, wherein the decision unit accepts the input of the input numeral key selected from among the plurality of the input numeral keys displayed in the first display area by the cursor following pressing of a decision key provided to the second casing and decides the input of the input numeral key.

10. An information processing apparatus, comprising:
a first casing;
a second casing which is hinge-connected to the first casing via a hinge part, the first and second casings configured to rotate about the hinge part between an opened state and a closed state;
first operation keys positioned on the first casing, the first operation keys being exposed during the opened state and hidden during the closed state;
a main display positioned on the second casing, the main display being hidden during the closed state;
a sub display positioned on the second casing, the sub display being exposed during the closed state, the sub display having first and second display areas;
second operation keys positioned on the second casing, the second operation keys being exposed during the closed state, the second operation keys including up, down, left, and right keys that are configured to control the movement of a cursor on the second display area of the sub display and a decision key that is configured to decide a numeral highlighted by the cursor;
a decision unit configured to:
during the opened state, accept and decide an input of numerals based on the pressing of the first operation keys and display the numerals as first decided numerals on the main display;
upon transition from the opened state to the closed state, display a plurality of input numeral keys in the first display area of the sub display, and display the first decided numerals on the second display area of the sub display upon transition from the opened state to the closed state; and
during the closed state, accept and decide as second decided numerals an input of numerals based on the pressing of the up, down, left, and right keys to navigate the cursor through the display of the plurality of input numeral keys and the pressing of the decision key to decide each input numeral key highlighted by the cursor, and display a combination of the first decided numerals and the second decided numerals in the second display area; and
an outgoing call unit configured to perform an outgoing call to another information processing apparatus during the closed state, the another information processing apparatus being identified by the combination of the first decided numerals and the second decided numerals displayed in the second display area of the sub display.

* * * * *